3,547,927
4,11-DICHLOROQUINACRIDONE PIGMENTS
Anthony P. Wagener, Park Forest, and George J. Meisters, Chicago, Ill., assignors to The Sherwin-Williams Company, Cleveland, Ohio, a corporation of Ohio
Filed Aug. 7, 1967, Ser. No. 658,888
Int. Cl. C07d 39/00
U.S. Cl. 260—279         10 Claims

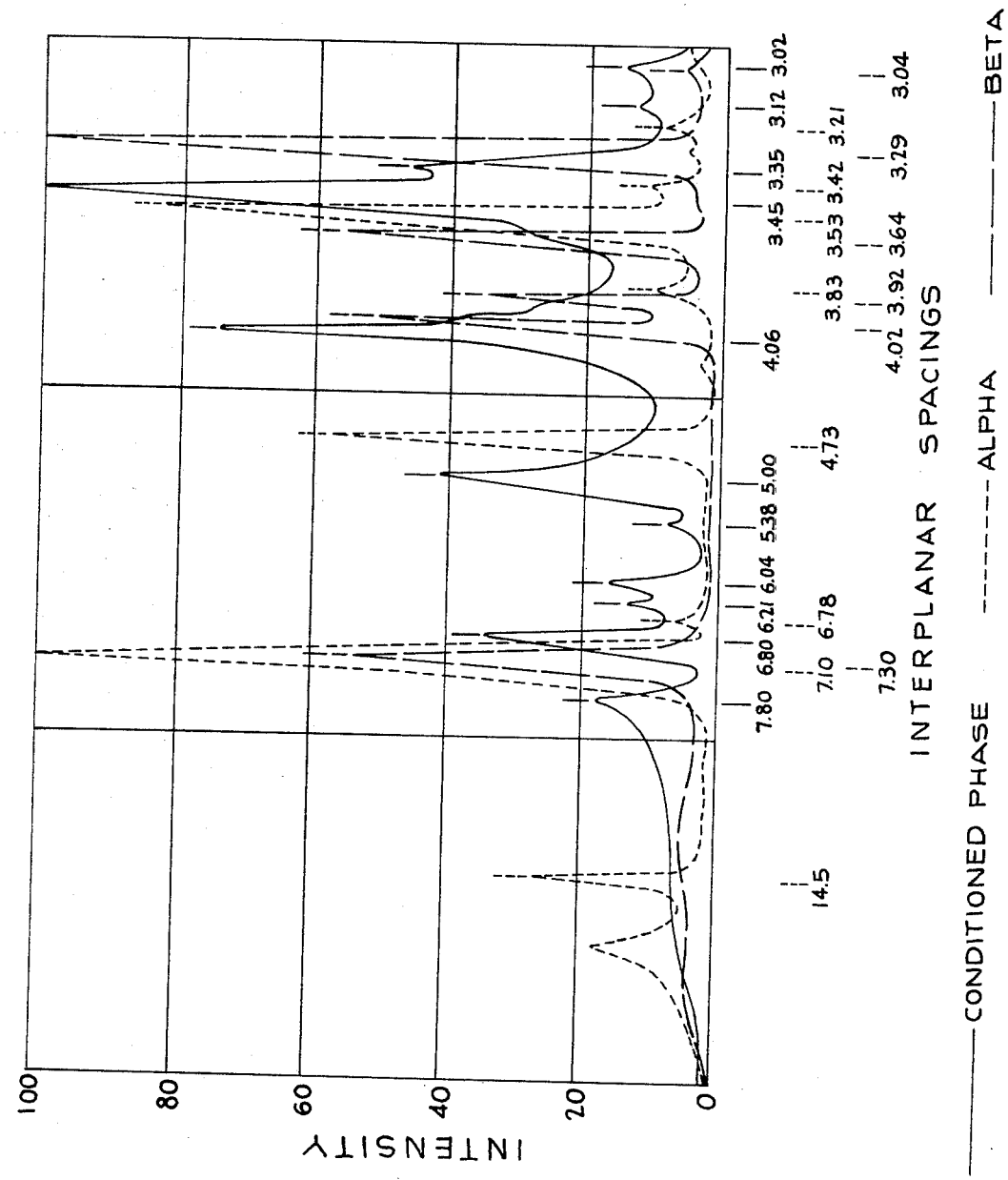

ABSTRACT OF THE DISCLOSURE

This invention comprises a new 4,11-dichloroquinacridone pigment and the method of preparing said pigment by milling the crude compound with a solid, soluble inorganic salt at approximately 100–175° C. This new phase of the compound is distinguished by its red-orange color and characteristic X-ray diffraction pattern. This product has an X-ray diffraction pattern having lines of strong intensity at interplanar spacings of 4.06 and 3.45 angstrom units, lines of intermediate intensity at 6.80, 5.00 and 3.35 A., and weak lines at 7.80, 6.21, 6.04, 5.38, 3.12 and 3.02 A. Its red-orange color is characterized by a dominant wave length of 606.5, a light purity of 92.8%, and a reflectance, or Y value, of 14.68 at 100% pigment.

---

This application relates to a new 4,11-dichloroquinacridone pigment. More specifically it relates to a particular 4,11-dichloroquinacridone pigment conditioned to give a distinctive red-orange color and to impart a characteristic X-ray diffraction pattern. Still more specifically, it relates to a process for preparing such pigments by conditioning the crude compound by the step of milling it with salt at a high temperature.

4,11-dichloroquinacridone is described in the patent literature, namely British Pat. 896,916 (1962), Belgian Pat. 618,873 (1962), U.S. Pat. 3,085,023 (1963), and methods of preparation have also been disclosed, see U.S. Pat. 3,107,248 (1963) and U.S. Pat. 3,264,297 (1966). Two forms of this compound, namely alpha and beta, have been defined by X-ray diffraction spectra in U.S. Pat. 3,160,510 (1964). The alpha has a very yellowish orange color and the beta is a very reddish orange.

This compound has the structural formula:

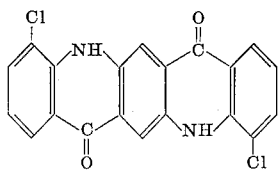

In accordance with the practice of this invention, it has now been found that 4,11-dichloroquinacridone of either the alpha or beta type, as well as mixtures thereof, can be converted to a new red shade of orange pigment having a new characteristic X-ray diffraction pattern by the steps of milling the compound with salt at 100–175° C., preferably about 150° C., and thereafter recovering the red shade orange pigment product from the salt.

This new pigment has a diffraction pattern characterized by a line of strong intensity at an interplanar spacing of 4.06 A., lines of intermediate intensity at 6.80, 5.00 and 3.35 A., and lines of weak intensity at 7.80, 6.21, 5.38 and 3.12 A., in addition to the various lines that are found in other phases of this compound. It also has a color defined by its tristimulus value as described hereinafter.

FIG. 1 represents graphically, the X-ray diffraction pattern of this compound in the form produced by the process of this invention, together with the corresponding curves for the alpha and beta phases of this compound.

In preparing the new phase of this compound described herein, the crude compound, in either its alpha or beta form, or mixture thereof, is milled with sodium chloride or other solid inorganic salt.

The inorganic salt used in the process of this invention can be of various types. Obviously it must be stable against decomposition at the temperatures used for the grinding operation and should be soluble in water or dilute acid so as to be easily removable from the dichloroquinacridone. Advantageously it should be one not having water of hydration which will be liberated during the grinding process. Because of its inexpensiveness and availability, sodium chloride is preferred. However, other salts such as potassium chloride, ammonium chloride, ammonium sulfate, sodium sulfate, calcium carbonate, etc. can be used. These can be of commercial grade, and any absorbed moisture present can be removed by preheating the salt separate from the quinacridone prior to its use.

The proportion of salt to pigment can be varied widely, ranging from 4 to 20 parts of salt per part of pigment. Very satisfactory results are obtained with about 9–10 parts of salt. Smaller amounts of salt require longer milling periods while larger amounts give no added advantage and therefore are less economical.

Various types of mills can be used for the milling or grinding operation provided that they are equipped for maintaining the desired temperature. It is only necessary that in addition to maintaining the temperature, the mill provides the shearing or attrition necessary to produce the desired particle size. For example, a roller mill or an edge-runner mill or ball mill can be used. Various balls, rolls, nails, etc. are advantageously used in addition to the salt for producing the grinding effect. The grinding time will vary according to the particular type of mill and grinding material used.

It is generally found desirable to mill for at least 15–20 hours depending on the efficiency of the mill. For laboratory size mills generally 24–72 hours is satisfactory, preferably about 48 hours. While no harm is done with excessive amounts of grinding, there is no added advantage in exceeding 72 hours.

While a temperature of about 150° C. is preferred, the actual temperature can vary to a substantial degree. Nevertheless, it has been found that temperatures in the range of 100–175° C. can be used advantageously in producing the new pigment of this invention.

The 4,11-dichloroquinacridone used for the purpose of this invention can be prepared by heating 2,5-bis(0-chloroanilino) terephthalic acid with an alkali metal hydrogen sulfate as described in U.S. Pat. No. 3,107,248.

This product can also be prepared as a mixture of alpha and beta forms as described in U.S. Pat. No. 3,160,510 by the conversion of 2,5-bis(o-chloroanilino) terephathalic acid in a manner similar to that described in U.S. Pat. No. 3,264,297 for the preparation of quinacridone by the use of benzoyl chloride and nitrobenzene.

It has also been found by the present inventors that beta phase 4,11-dichloroquinacridone, or mixtures containing the alpha and beta, can be converted to the alpha-phase by heating the material with a methanol solution of KOH. It has also been found that the alpha-phase, or mixtures containing the alpha-phase and beta-phase can be converted to the beta-phase by heating the material with N-methyl pyrrolidone. It has also been found that the 4,11-dichloroquinacridone can be prepared completely in the alpha-phase by using pyridine also in the benzoyl chloridenitrobenzene preparation referred to above.

This invention is best illustrated by the following examples. These examples are given merely for purposes of illustration and are not intended in any way to restrict the scope of the invention or the manner in which it can be practiced. Unless specifically provided otherwise, parts and

EXAMPLE I

A mixture of 1000 g. of 2,5-bis(o-chloroanilino)terephthalic acid and 5000 cc. of nitrobenzene containing 1010 g. benzoyl chloride is stirred and heated gradually over a period of two hours up to a temperature of 190° C. The mixture is then stirred at 193–195° C. for 21 hours, then cooled to 150–120° C. and filtered. The orange product is washed with 2.5 liters of nitrobenzene at 100° C., then with 3 liters of cold methanol, and dried with suction. The resultant filter cake is stirred for 1–2 hours in 3 liters of methanol and then filtered. The filtrate is again washed with 3 liters of methanol, dried with suction and then in an oven at 125° C. to constant weight. The 810 grams of orange 4,11-dichloroquinacridone represents a yield of 89% of theoretical. X-ray diffraction analysis shows that this product contains about 55% of the alpha phase and 45% of the beta phase.

Repetition of the foregoing procedure shows a yield as high as 95% can be obtained and the ratio of alpha to beta phase as determined by X-ray analysis can vary from mostly beta to as much as 70% alpha.

EXAMPLE II

A 120 gram sample of the product of Example I is refluxed and stirred for five hours in a solution of 300 grams of potassium hydroxide in 1200 cc. methanol. This suspension is then cooled, filtered and slurried in 3 liters of methanol for one hour. After this is again filtered, the product is washed with another liter of methanol, again slurried in 3 liters of methanol, filtered and washed with one liter of methanol. The resultant orange product is dried to constant weight at 125° C. giving 111.5 grams (93% yield) of almost pure alpha phase 4,11-dichloroquinacridone as identified by X-ray analysis.

When the foregoing procedure is repeated using a starting material of substantially all beta phase and various mixtures containing various ratios of alpha and beta, similar results are obtained in converting substantially completely to the alpha phase.

EXAMPLE III

A 120 gram sample of the product of Example I is stirred and refluxed in one liter of N-methylpyrrolidone for 8 hours. The mixture is cooled, filtered, and the filter cake washed with 250 cc. of methanol and then dried with suction. This product is slurried in one liter of methanol for 2 hours, filtered, washed with 250 cc. of additional methanol and dried with suction, and then in an oven at 125° C. to constant weight. The product is orange 4,11-dichloroquinacridone in the beta phase as identified by X-ray diffraction analysis and in this case there is obtained a yield of 111.3 grams (92.5%). Upon repetition of this procedure, using various mixtures of alpha and beta phases, yields of beta phase up to 98% of theoretical are obtained.

By using the procedures of Examples II and III to obtain substantially pure alpha and beta phases, various synthetic mixtures can be prepared containing various ratios of alpha and beta phases.

EXAMPLE IV

In the following procedure a ball mill is used comprising a quart cylindrical steel jar charged with 2500 grams of 5/8 inch diameter steel balls or a mixture of 2250 grams of such balls and 250 grams of nails No. 6D, the nails being used to help prevent caking tendencies during milling. The cylindrical jar is 4.5 inches long and 5.5 inches in diameter. This jar is equipped with a lid having a suitable heat-resistant gasket for sealing, preferably a silicone rubber gasket. It is rotated by rollers whose speed is adjusted so that the rate of rotation is 106 r.p.m. In each experiment, a charge of 20 grams of 4,11-dichloroquinacridone and 180 grams of dried sodium chloride is used. In each case the sample and the salt together with the mill and grinding medium are stored overnight in a forced draft oven at 100–110° C. to remove any residual moisture that may be present. The mill is then charged with the sample and the salt.

The milling is carried out for 48 hours at 150° C., the temperature being maintained by having the mill rolls and mill inside an oven maintained at the desired temperature. The charge remains free-flowing during the grinding operation. Upon completion of the milling, the contents of the mill are discharged, and separated from the steel balls by means of a coarse sieve. The milled solid has a bright orange color and weighs 200 grams. This product dispersed by mixing in a Waring Blendor in 500 ml. of water for 5 minutes at full speed. The resultant slurry is transferred to a 3000 ml. beaker and agitated by means of a sweep type agitator. To this is added a solution of 52.8 gms. of 98% sulfuric acid in 479 gms. of water to yield a 5% $H_2SO_4$ concentration in the slurry. The resultant mixture is heated at 95–100° C. for 30 minutes after which the solids are filtered on a Buchner funnel and washed to neutrality. The resultant filter cake is dispersed in water by mixing in the Waring Blendor for three minutes in sufficient water to yield a fluid slurry. This slurry is returned to the beaker and water added until the volume is increased to 1000 ml. It is agitated and heated at 95–100° C. for 15 minutes after which the solids are filtered on a Burchner funnel and washed again with water. The filter cake thus obtained has a solids content of approximately 30% and is suitable for further processing as desired, i.e. flushing, preparation of dry colors, etc. The yield is 19.3 grams or 96.5% on a 100% solids basis.

Using the above procedure, seven samples of 4,11-dichloroquinacridone having 100%, 85%, 75%, 50% 25%, 15% and 0% of the alpha phase, with the balance in each case being beta phase, are prepared by mixing the alpha and beta phases produced according to Examples II and III. In each case, the pigment conditioned according to the above procedure has the new red-orange shade and has a diffraction spectrum having interplanar spacings in angstrom units as shown in the table below which also includes the X-ray diffraction spectra for the alpha and beta phases.

| Relative intensity | Alpha phase | Beta phase | New phase |
|---|---|---|---|
| Strong lines, A | 7.10 | 3.29 | 4.06 |
|  | 3.53 |  | 3.45 |
|  | 4.73 | 7.30 | 6.80 |
| Intermediate lines |  | 4.02 | 5.00 |
|  |  | 3.92 | 3.35 |
|  |  | 3.64 |  |
|  | 14.50 | 3.04 | 7.80 |
|  | 6.78 |  | 6.21 |
| Weak lines | 3.83 |  | 6.04 |
|  | 3.42 |  | 5.38 |
|  | 3.21 |  | 3.12 |

The new red-orange color is analyzed by obtaining tristimulus data, Munsell renotations, the dominant wave length, and the percent of purity for each sample. The tristimulus data are collected for three levels of pigmentation, namely 100%, 10% and 1% as diluted with ZnO white with the pigment in each case suspended in a varnish as colorless as possible so that it contributes no color. Two parts of varnish are used per part of pigment. These measurements are made by the use of a General Electric Recording Spectrophotometer with a Davidson Hemmendinger Tristimulus Integrator and using as the reference standard a pressed $BaSO_4$ which is manufactured by Bausch and Lomb, Inc.

The spectrophotometer is calibrated for wavelength, reflectance level-100% line, and internal electronics before the samples are run. From the tristimulus output of the integrator, the chromaticity coordinates $x$ and $y$ are calculated by summing the tristimulus values and dividing this into tristimulus X and Y.

$$x = \frac{X}{X+Y+Z}$$

$$y = \frac{Y}{X+Y+Z}$$

$$Y = Y$$

The third variable Y is equal to tristimulus Y.

By using the chromaticity coordinates in conjunction with a set of charts which were prepared by the Color Measurement Laboratory of the Agricultural Marketing Administration, USDA, the Munsell Renotations are determined. The data for these charts is based on the "Final Report of the O.S.A. Subcommittee on the Spacing of the Munsell Colors," J. Opt. Soc. Am. 33, 1943, By the use of the book entitled "Handbook of Colorimetry" by Arthur C. Hardy; The Technology Press M.I.T., Cambridge, Mass., 1936, and these same chromaticity coordinates, the percent purity and the dominant wavelength are determined.

The results obtained from such color analyses of the samples are shown below:

| | X | Y | Z |
|---|---|---|---|
| 100% 9.07R 4.38/16.28, 92.8% purity (light), 606.5 dom. wave, $x=.6282$; $y=.3441$: | | | |
| 100% | 26.80 | 14.68 | 1.18 |
| 10% | 38.39 | 22.32 | 8.67 |
| 1% | 53.91 | 36.64 | 34.67 |

The dilutions are made from 100% to 10% and 1% with ZnO white and the tests are performed in a colorless varnish, using 2 parts of varnish per part of pigment.

The color of this product is identified as having a dominant wavelength of 606.5, a light purity of 92.8%, and a reflectance or Y value of 14.68 at 100%.

EXAMPLE V

The procedure of Example I is repeated except that 330 parts of pyridine are added to the benzoyl chloride nitrobenzene mixture prior to the reaction. Instead of obtaining a mixture of alpha and beta as in Example I, the product in this case is entirely the alpha phase as shown by the X-ray diffraction pattern. When this product is used in the procedure of Example IV, either by itself or in various mixtures with beta phase produced in Example III, similar results are obtained as in Example IV.

When the procedure of Example IV is repeated, varying the proportion of salt from 6 to 15 parts per part of sample, similar results are obtained as in Example IV. Likewise, when temperatures of 110°, 140°, 160°, and 170°, respectively are used, similar results are also obtained.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A 4,11-dichloroquinacridone pigment having a red-orange color and an X-ray diffraction pattern characterized by a line of strong intensity at an interplanar spacing of 4.06 angstrom units, lines of intermediate intensity at 6.80, 5.00 and 3.35 A. and lines of weaker intensity at 7.80, 6.21, 5.38 and 3.12 A.

2. The process of preparing the pigment of claim 1 comprising the steps of salt milling relatively pure 4,11-dichloroquinacridone with a soluble inorganic salt, thermally stable and solid at the temperature of said salt milling and selected from the class consisting of ammonium chloride, ammonium sulfate, and alkali metal and alkaline earth metal inorganic salts, at a tempeature in the range of 100–175° C. and thereafter separating said pigment from said salt.

3. The process of claim 2 in which said salt is sodium chloride.

4. The process of claim 3 in which said sodium chloride is used in an amount of at least 4 parts by weight per part by weight of said pigment.

5. The process of claim 2 in which said temperature is approximately 150° C.

6. The process of claim 2 in which said salt is sodium chloride and said temperature is about 150° C.

7. The process of claim 6 in which said salt is used in an amount of at least 4 parts by weight of said salt per part by weight of said pigment.

8. The process of claim 7 in which said milling is conducted for a period of at least 15 hours.

9. The process of claim 2 in which said milling is conducted for a period of at least 15 hours.

10. A pigment of claim 1 in which the X-ray diffraction pattern has lines of strong intensity at interplanar spacings of 4.06 and 3.45 angstrom units, lines of intermediate intensity at 6.80, 5.00 and 3.35 angstrom units, and lines of weaker intensity at 7.80, 6.21, 6.04, 5.38, 3.12 and 3.02 angstrom units.

References Cited

UNITED STATES PATENTS

| 2,844,484 | 7/1958 | Reidinger et al. | 260—279 |
| 3,148,191 | 9/1964 | Jackson et al. | 260—279 |
| 3,157,659 | 11/1964 | Devscher et al. | 260—279 |
| 3,160,510 | 12/1964 | Ehrich | 260—279X |
| 3,121,718 | 2/1964 | Higgins | 260—270 |

DONALD G. DAUS, Primary Examiner

U.S. Cl. X.R.

106—288; 260—518, 544